United States Patent [19]
Pohjalainen

[11] Patent Number: 5,816,494
[45] Date of Patent: Oct. 6, 1998

[54] SUMMER OPERATION APPARATUS FOR A HEATING SYSTEM

[76] Inventor: Raimo Pohjalainen, Rouhialankatu 51, FIN-50100, Mikkeli, Finland

[21] Appl. No.: 677,377

[22] Filed: Jul. 5, 1996

[30] Foreign Application Priority Data

Oct. 18, 1995 [FI] Finland ................................. 954756

[51] Int. Cl.⁶ ........................................................ F24H 3/06
[52] U.S. Cl. .............................. 237/8 R; 417/14; 62/180
[58] Field of Search .......................... 237/8 R; 417/14; 62/180

[56] References Cited

U.S. PATENT DOCUMENTS

| 4,492,091 | 1/1985 | Whitwell et al. | 62/180 |
| 5,184,472 | 2/1993 | Guilbault et al. | 62/160 |

FOREIGN PATENT DOCUMENTS

| 56-138473 | 10/1981 | Japan | 417/14 |
| 61-250388 | 11/1986 | Japan | 417/14 |

*Primary Examiner*—Henry Bennett
*Assistant Examiner*—Derek S. Boles
*Attorney, Agent, or Firm*—Fildes & Outland, P.C.

[57] ABSTRACT

A summer operation apparatus for a circulating water heating system includes a separate auxiliary device installable in connection with the system controller. The auxiliary device includes an external temperature sensor for sensing the outside temperature and also a first switching device for controlling the system pump. A second switching device converts the signal of a signal line of the temperature sensor of a controller so that it can shut the system valve. The auxiliary device also includes a control for controlling the first and second switching devices according to the external temperature thereby implementing a summer operation state for pump and valve. A timer device can be included for starting the pump intermittently in the summer operation state for short periods at a time.

4 Claims, 4 Drawing Sheets

SUMMER OPERATION APPARATUS FOR A HEATING SYSTEM

FIELD OF THE INVENTION

This invention relates to a water media heating system and more particularly to a circulating water circuit control that provides summer operation of the heating system.

BACKGROUND OF THE INVENTION

In a conventional heating system, the heat source, e.g. heat from district heating, is transferred by means of a heat exchanger to the circulating water circuit, where a pump circulates the water. In this circuit, heat is taken from the heat exchanger and emitted in a radiator network. In a direct connection, the heat source, a boiler, is in the actual circulating water circuit. The circulation pump is nearly always switched on, whatever the heating output, which, in a district heating circuit, is controlled by means of a motor valve.

In a direct connection, a three-way valve is used, by means of which the output and input lines are partly short-circuited. The system includes an external temperature sensor and a temperature sensor in the circulating water circuit of the radiator network, the heating being controlled from the data provided by the sensors.

In an air heating system, the heat is transmitted to the air being blown into the rooms with the aid of a heating radiator, in which a circulating water circuit is on one side. Here, the circulating water circuit has a pump, which is also generally kept continuously switched on, as is the motor-controlled shut-off valve. The pump is generally kept switched on, even when the heat is completely cut off and the shut-off valve closed, when the pump only circulates water past the heat exchanger through a release valve behind the pump.

In summer operation, it is wished in both cases to close the pump to save energy. In practice, the pump may be shut off completely for many months, which can have serious consequences for the reliability of the system.

One circulating water circuit control device is known (Landis & Gyr, model RLV45), which shuts the pump and closes the operating device, once a certain command criterion is achieved, for example, a certain external temperature. In addition to this, the device has so-called interval starting of the pumps, by means of which the circulation pump is started intermittently for 30 seconds every 18 hours. Solid substances are flushed out, ensuring the reliable operation of the pumps. It is not worth installing the aforementioned control device in place of hundreds of thousands of older control devices only because of summer operation. The existing devices require a simpler solution.

It is the intention of the invention to create this kind of summer operation apparatus for use with existing control automation, permitting the implementation of simple and reliable summer operation of the circulation.

SUMMARY OF THE INVENTION

An object of the invention is to provide a summer operation apparatus for a heating system, in which system a pump circulates heated water in a circulating water circuit and a valve driven by an operating motor controls the heat input, under the control of a controller and a temperature sensor, which system includes means for creating a summer operation state, when the valve is closed and the pump stopped on the basis of a preset temperature criterion.

In carrying out the above object and other objects of the invention, the apparatus is used in connection with a circulating water heating system including pump for circulating water and a radiator network for emitting heat. A valve directs the heat input to the water circulation circuit. The valve is driven by an operating motor and a sensor measures temperature. A controller connected to the sensor operates the motor for controlling the valve depending on the temperature and a switching means switches off the heat input by closing the valve and stopping the pump in accordance with a preset temperature criterion.

The summer operation apparatus is formed as a separate auxiliary device and is installable in connection with the controller. The auxiliary device includes external temperature sensing means for sensing the outside temperature. The sensor means includes a first switching device for controlling the pump and a second switching device for converting the signal of a signal line of a temperature sensor of a controller so that it can shut the valve. The auxiliary device also includes control means for controlling the first and second switching devices according to the external temperature thereby implementing a summer operation state for pump and valve. A timer device can be included for starting the pump intermittently in the summer operation state for short periods at a time.

Preferably the auxiliary device includes connectors through which the power supply of the motor is connected and a power source being connected to at least one connector in order to produce operating energy for the auxiliary device.

In one embodiment, the summer operation apparatus includes a heat exchanger and valve on the primary side of the heat exchanger whereby the circulating water is heated indirectly. Alternatively, in a further embodiment, the summer operation apparatus includes a boiler in the circulating water circuit which feeds heat directly to the circulating water circuit and a three-way valve which is operable to short-circuit the circulating water circuit.

Alternatively the apparatus is used in connection with an air heating system including an air duct for taking air from outside and blowing it inside. Such system includes a circulating water circuit in which there is a pump, an air heating radiator, and a valve. The pump circulates the water in the circulating water circuit and the air heating radiator emits heat to the air being blown inside. The valve controls the input of heat to the air heating radiator and an operating motor drives the valve. A temperature sensor in communication with a controller operates the motor for controlling the valve depending on the temperature. Control means is provided for cutting off the heat input by closing the valve and stopping the pump according to a preset temperature criterion.

The summer operation apparatus formed as a separate auxiliary device to be installed in connection with the controller includes sensing means for sensing the outside temperature, a first switching device to control the pump, and a second switching device for converting the signal of the signal line of the temperature sensor to shut the valve. Control means control the first and second switching devices depending on the outside temperature and the pump and valve for implementing the summer operation state. Pump starting means may be provided for intermittently starting the pump during the summer operation state for short periods at a time.

The valve in the summer operation apparatus is not directly controlled by the power supply to the operating motor, but indirectly with the aid of an appropriate temperature sensor, the signals from which are positively guided to such a value that the existing operating device switches off the operating motor.

These and other features and advantages of the invention will be more fully understood from the following detailed description of the apparatus itself and embodiments of the invention taken together with the accompanying drawings.

DETAILED DESCRIPTION OF THE INVENTION

Figure 1:
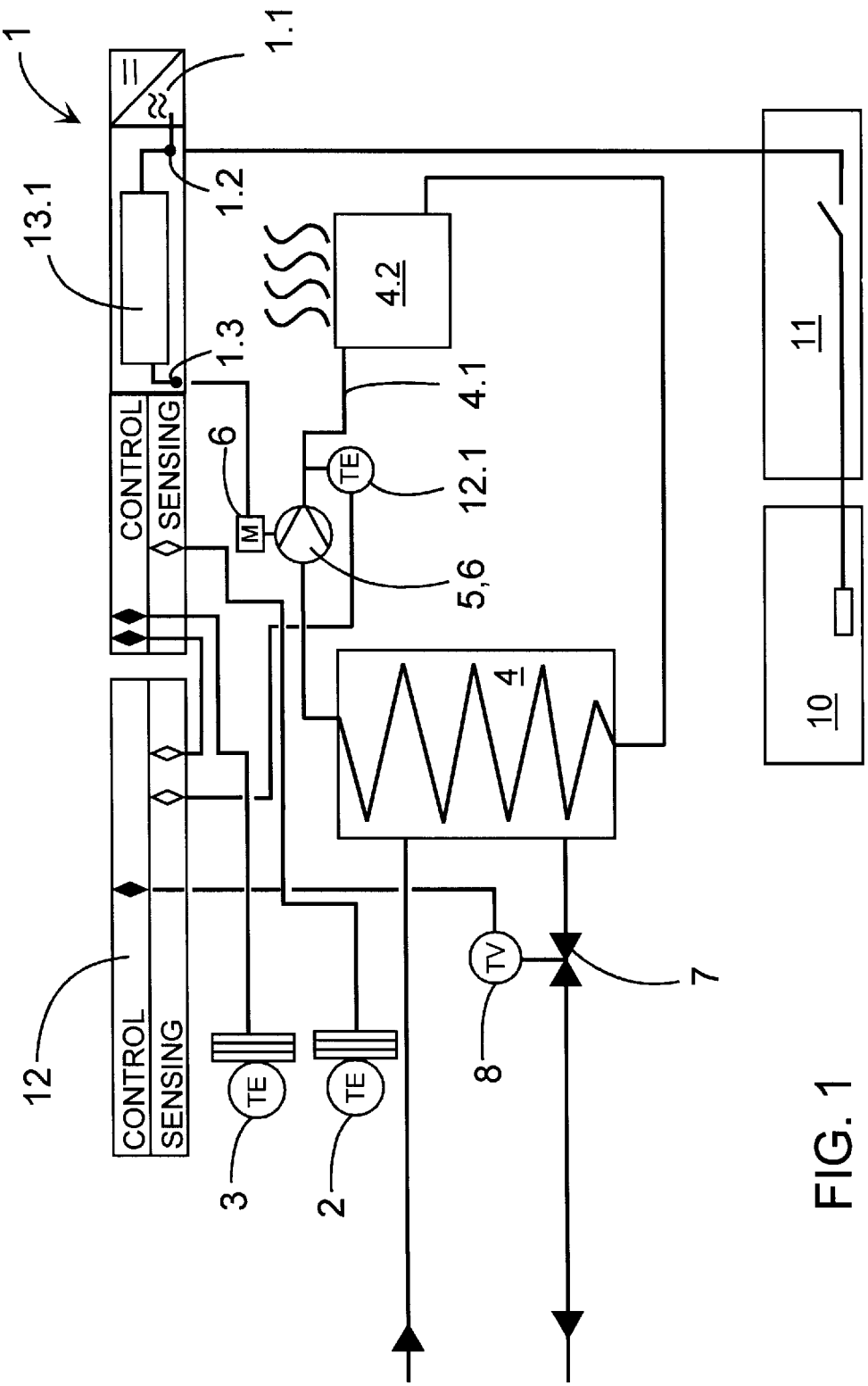
FIG. 1 shows the application of a summer operation apparatus in accordance with the invention in a circulating water heating system.

The circulating water heating system in FIG. 1 is indirectly connected to a district heating system with the aid of heat exchanger 4. The household water circuit, which does not fall within the scope of this invention, is not marked in the Figure. The intake of heat from the district heating system is controlled by valve 7, which is controlled by operating motor 8. In the circulating water circuit 4.1 of the radiator network 4.2, there is a pump 5, the motor of which is continuously supplied with power from voltage feed 10. This power supply line is connected to auxiliary device 1 according to the invention, through connectors 1.2 and 1.3, between which there are relay switches 13.1. The power source 1.1 of the auxiliary device 1 is connected to connector 1.2, to provide operating energy for the auxiliary device itself. The conventional control device is marked with the reference number 12, and receives its commands from, among other sources, an external temperature sensor 3. This signal line is led through auxiliary device 1 for positive guidance of the signal. The auxiliary device 1 includes its own external temperature sensor 2.

Here the auxiliary device 1 operates under the control of the external temperature sensor 2, so that when the external temperature rises to the set limit value, the summer operation apparatus cuts the continuous voltage feed to circulation pump 5 by means of relay 13.1, and positively guides the signal from the external temperature sensor 3 to the normal control equipment so that it positively guides operating motor 8 to close valve 7. When the external temperature drops below the other set limit value, operation is once again controlled by the normal adjustment device. The apparatus also includes intermittent starting for the pump, as described herein.

Figure 4:
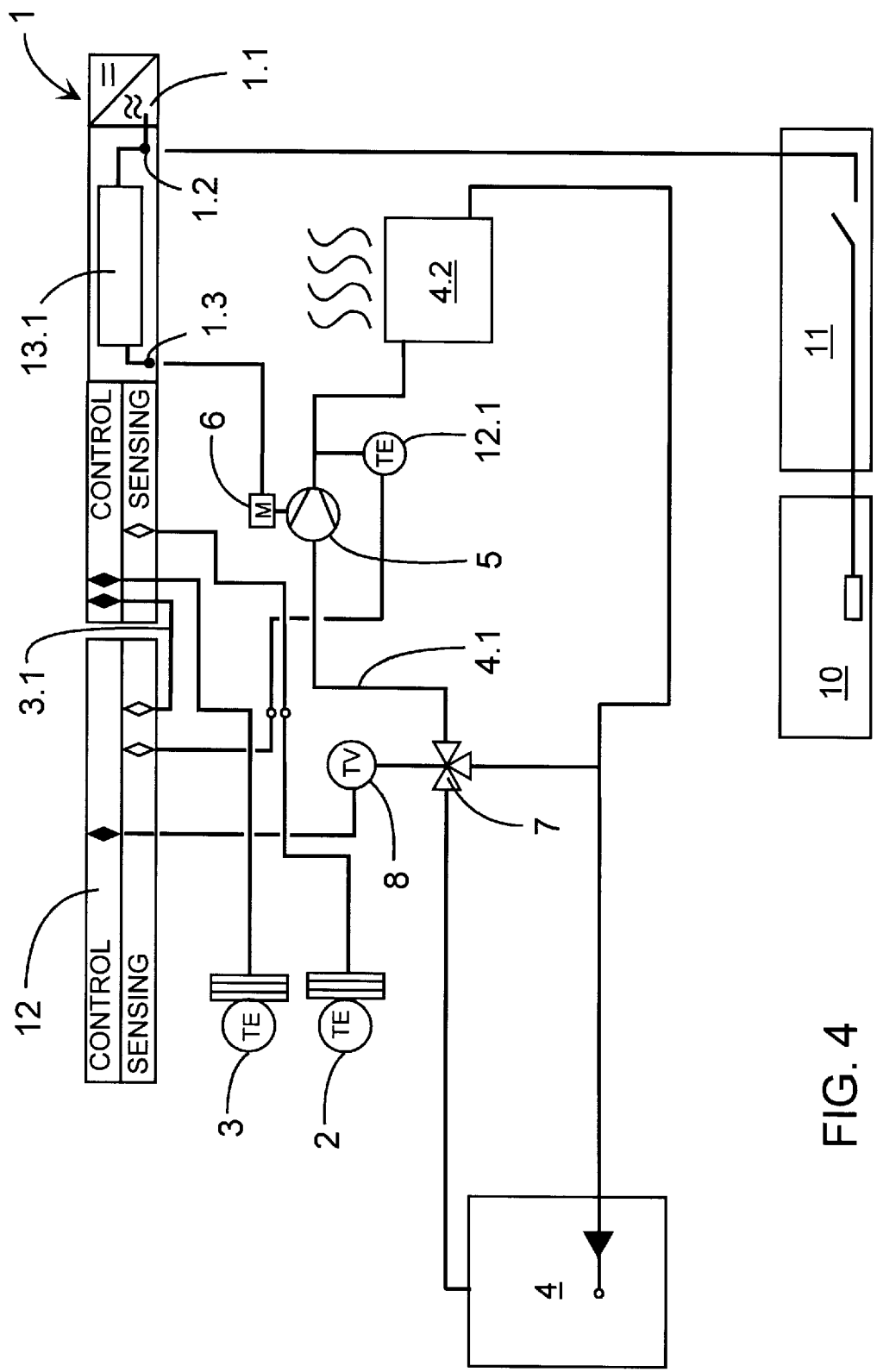
FIG. 4 shows a variation of FIG. 1 in direct circulating water heating.

As an alternative to the heating system in FIG. 1, auxiliary device 1 is also suitable for use in a direct circulating water heating circuit according to FIG. 4. In FIG. 4, the same reference numbers are used for operationally corresponding components. Heating boiler 4 heats the circulating water circuit 4.1 of the radiator network 4.2 directly. The heat output emitted by boiler 4 is controlled by three-way valve 7, which permits part of the return flow to bypass the boiler. The Figure does not show the control connections of the control of boiler 4, nor the household water heating circuit. Auxiliary device 1 stops circulating water pump 5 and positively guides the three-way valve 7 to its extreme position, in the same way as above.

Figure 2:
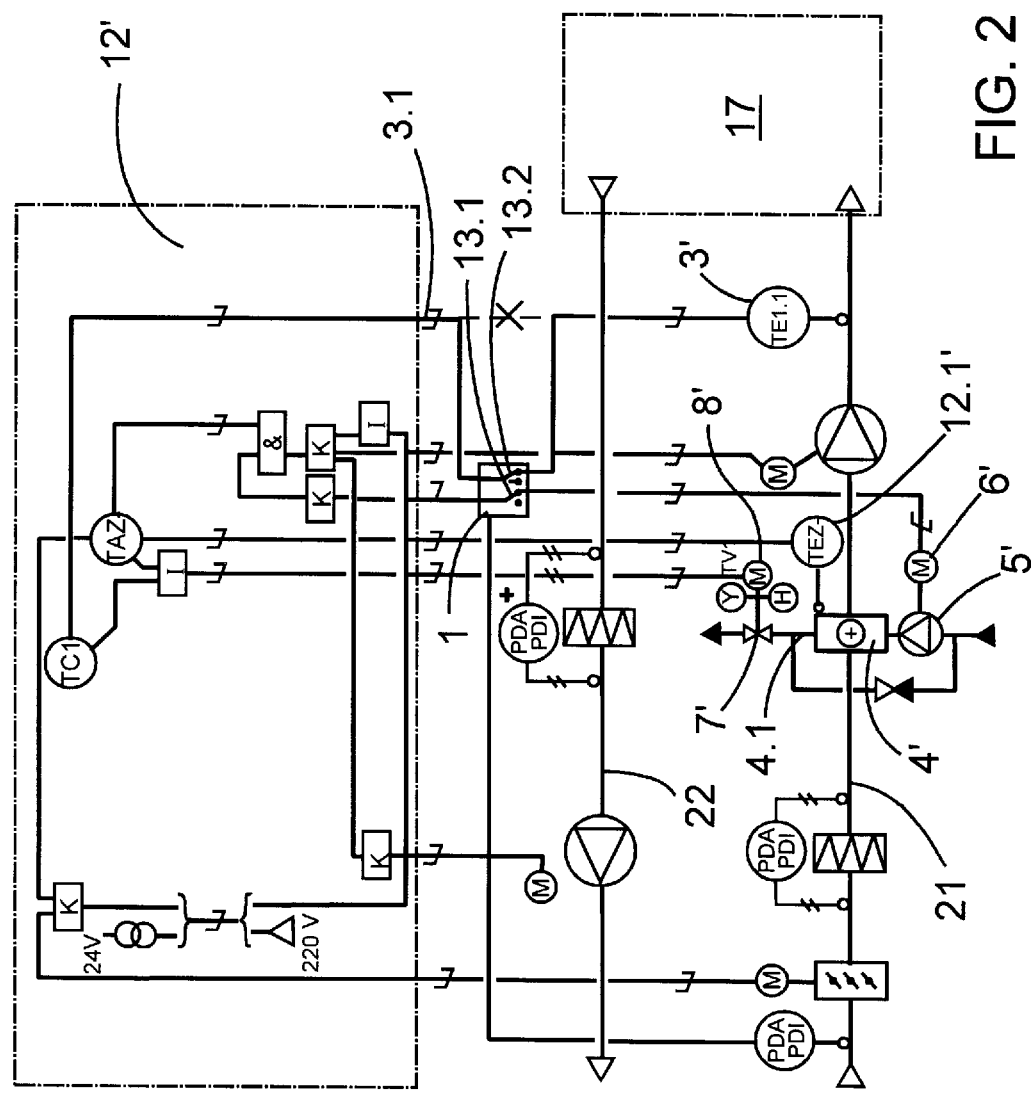
FIG. 2 shows the application of a summer operation apparatus in accordance with the invention in an air heating system.

In the air heating system in FIG. 2, there is an intake air duct 21 from the outside of the building inwards and an outlet air duct 22 from the inside of the building outwards. In the intake air duct 21, there are an adjustment damper, filter, air heating radiator 4', and a fan in series. In the outlet air duct 22, there are a fan and filter in series. The original control device (12') of the system operates the fan, pump, and adjustment damper.

The normal control device measures the temperature of the air to be blown into the room with the aid of sensor 3', and the temperature of the circulating water circuit 4.1' with the aid of sensor 12.1'. On the basis of these, the control valve 7' of the circulating water circuit is adjusted with the aid of operating motor 8'. Pump 5' is driven by motor 6', which generally receives a continuous voltage supply from controller 12'. The switch relay 13.1 of the auxiliary device 1 according to the invention is, however, located on this line. In this embodiment, the device's own external temperature sensor 2' is connected to the intake air duct, and the signal line 3.1' of the temperature sensor 3', for the air being blown in, is led through the second switch relay 13.1 of the auxiliary device according to the invention. Here the operation is as follows. When the temperature of the intake air discerned by the temperature sensor 2' rises above a certain limit value, auxiliary device 1 stops pump 5' by cutting the power supply to motor 6'. In addition to this, the signal of the original temperature sensor 3' of the system is positively guided to display a value of e.g. 50° C. to control device 12', which on account of this positively guides valve 7' shut, through operating device 8'.

For this purpose, the auxiliary device 1 includes second switching devices 13.2. Controlling the operating motor directly is possible, but then the apparatus must be designed in this area according to the type of operating motor, which would in practice be much more difficult.

Figure 3:
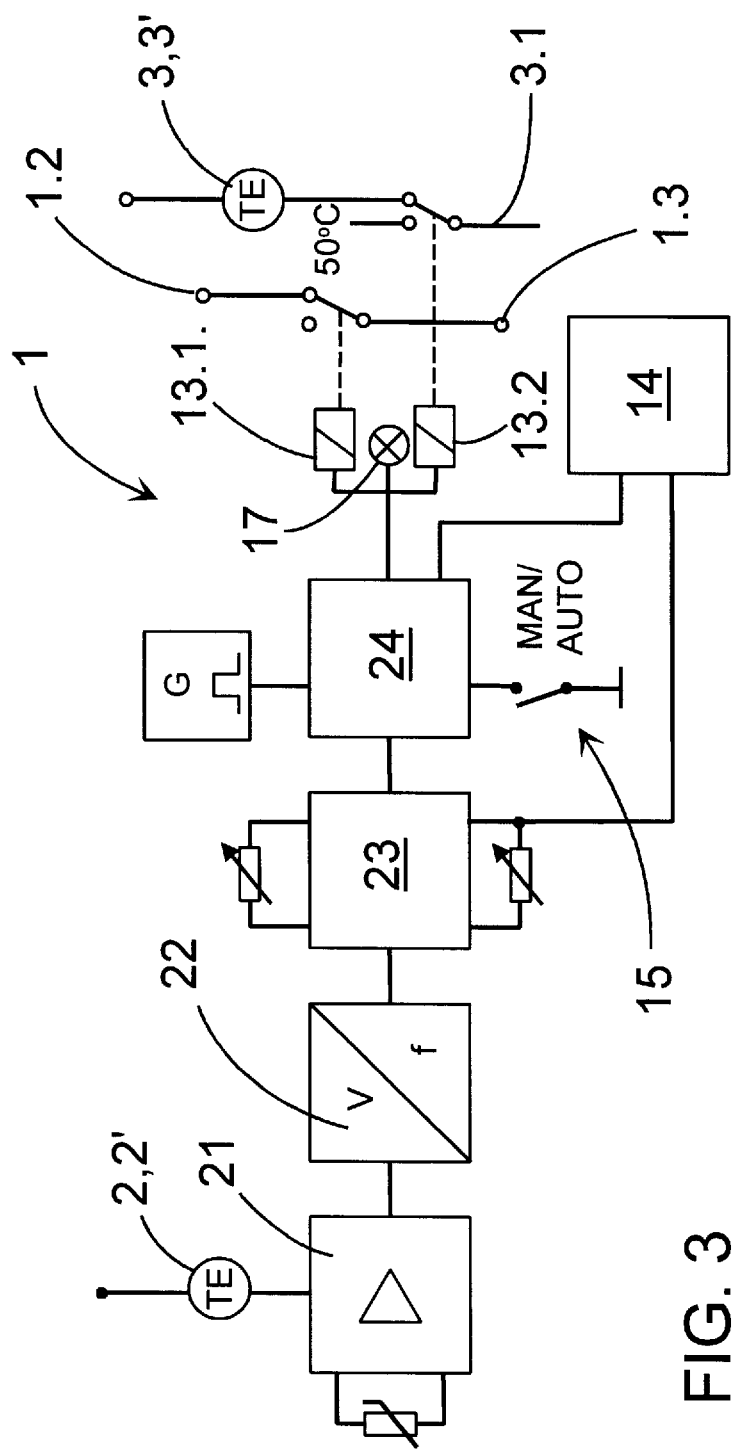
FIG. 3 shows detailed block diagrams of the summer operation apparatus.

In FIG. 3, the summer operation apparatus is shown as a separate block diagram without the power source, consisting of the connections to the device's own temperature sensor 3.3'. The components of FIG. 3, and the power source, except for the sensors, are installed in their own case.

GENERAL

The apparatus commands the circulation pump and the control valves according to the external temperature. The apparatus stops the circulation pump at the set external temperature (e.g. +18° C.) and positively guides the water valve shut. When the external temperature drops (e.g. to +13° C.) the apparatus starts the circulation pump and the heating controller adjusts the heating normally, according to the control curve. The apparatus includes an analog sensor connection 21, thermometers 2, 2', a V/F converter 22, control and command logic 23, 24, a fault indicator 14, and a power supply.

SENSOR CONNECTION

The sensor 2, 2' is connected to the input of an operational amplifier 21. The amplifier amplifies linearly the voltage variation caused by changes in the resistance value of the sensor due to changes in temperature. Voltages of 1–8.5 V are obtained from the output of the amplifier for a temperature range of +5°–+30° C. This voltage controls the V/F converter 22.

THERMOMETER

The meter is made using an LED command circuit UAA170. It obtains command voltage from the sensor amplifier and commands 16 LEDs so that the lowest shows +10° C. and the highest +25° C. The color of the LEDs is selected as green for the temperature range 10°–14° C., yellow for 15°–18° C., and red for 19°–25° C. The meter goes out when the MAN command is on, when the summer operation is not switched on.

V/F-CONVERTER (22)

The converter 22 is implemented using circuit LM331. Its output provides a square pulse sequence, which varies in frequency in relation to the input voltage, the basic frequency of which pulse chain can be adjusted using a trimmer. In this form of connection it is set to a value of 1000 Hz/V. The RC circuit in terminal 5 determines the desired frequency range.

CONTROL LOGIC (23)

The output of the V/F converter provides a clock pulse for the counter of the control logic 23. There are two counters, one of which operates at a lower temperature (pump on) and the other at a higher temperature (pump off). The counters are reset after intervals determined by the VCO circuits CD4046. These intervals are adjusted by means of potentiometers. Because the pulse frequency depends on the temperature, setting the desired on/off temperature values is possible, by altering the counting time.

COMMAND LOGIC (24)

The NOR gate (IC11 B) gets on/off commands from a flip-flop, the MAN/AUTO switch, and the timer 25. The connection is carried out so that it keeps the pump running with the ON command of the control logic 23, the AUTO command of the MAN/AUTO switch, and with the timer 25 for about 2,5 minutes at intervals of about 10 hours.

If the apparatus is damaged, (e.g. a fuse blows because of a component failure) the output relay 13.1 keeps the pump running, because it is connected so that the points of the relay are closed when there is no current. Relay 13.2 fools the primary heat controller 12 so that, when the circulation pump is not running, it positively guides the water valve 7 shut. An indicator 17 (lamp) shows the on/off state of the circulation pump.

FAULT INDICATOR (14)

The indicator lights a red LED, if the ON/OFF commands have been cross-set or the control logic tries to switch the pump off during an ON command. The apparatus also keeps the pump running during these malfunctions. The indicator only shows the operator that he has cross-set the temperature settings or that there is a fault in the logic of the apparatus, so that he should check these.

The auxiliary device 1 advantageously includes connectors, which may be the connectors of the directly used contactor, through which the power supply of the pump motor 6, 6' is connected and the auxiliary device includes a transformer connected to this for providing operating power to the command logic. In this case, the auxiliary device is connected simply to the supply line of the pump, and a separate supply line need not be made at all. Because of the contactor, the power supply must in any event be brought through the auxiliary device, the power required by the auxiliary device itself can be taken from this same line. In a three-phase system, the supply to the unit can be taken from between two phases, when the ground potential is not required at all. Besides the power line, only its own temperature sensor need be connected to the auxiliary device and the signal line of the temperature sensor of the existing control led through it.

Preferably, the summer operation apparatus includes a moisture sensor and a clock circuit timer, which are arranged to switch on the heating when the relative moisture exceeds a preset limit value (e.g. RH>70% ), a preset period (e.g. 10 h), and the temperature is within a certain range (e.g. between 10°–14° C.).

The signal from the moisture content sensor can be led to the same kind of V/F converter as above and the number of pulses in the period compared with the preset value. V/F converter 22 of the temperature sensor is led to another comparator. The essential element is formed by the basic logic, according to which the moisture content and temperature status signals (binary) are led to an AND comparator, the TRUE status of which switches on the timer and the FALSE status resets the timer. If the time condition of the timer is fulfilled, the heating starts and the increased heat control is switched on. The former is the same operation as above (FIGS. 1–3). Increased heat control has, in the apparatus, a third level of switching devices for converting the signal of the water sensor 12.1 of the normal controller so that a greater input of heat takes place than would be required by the correct signal. The operation ends, for example, on the basis of the FALSE status of the AND comparator.

Although the invention has been described by reference to specific embodiments, it should be understood that numerous changes may be made within the spirit and scope of the inventive concepts described. Accordingly, it is intended that the invention not be limited to the described embodiment, but that it have the full scope defined by the language of the following claims.

What is claimed is:

1. A summer operation apparatus for a circulating water heating system including:

a pump for circulating water in a water circulation circuit, in which there is a radiator network for emitting heat, a valve for directing the heat input to said water circulation circuit, wherein the valve is driven by an operating motor, a sensor for measuring external temperature, a controller connected to the sensor and operating motor for controlling the valve depending on the temperature, and means for switching off the heat input by closing said valve and stopping said pump in accordance with a preset temperature criterion, thus creating a summer operation state, and wherein the summer operation apparatus is formed as a separate auxiliary device to be installed in connection with the controller, wherein said auxiliary device includes:

means for sensing the outside temperature, the means for sensing the outside temperature, including a first switching device for controlling the pump, means, including a second switching device for converting the signal of the signal line of the temperature sensor of the actual controller so that it can shut valve, means for controlling the first and second switching devices according to the external temperature and thus implementing a summer operation state for pump and valve, and means including a timer device for starting the pump intermittently in the summer operation state for short periods at a time.

2. A summer operation apparatus in accordance with claim 1, in which the auxiliary device includes connectors through which the power supply of the motor is connected and a power source being connected to at least one connector in order to produce operating energy for the auxiliary device.

3. A summer operation apparatus in accordance with claim 1 including a heat exchanger and valve on the primary side of the heat exchanger whereby the circulating water is heated indirectly.

4. A summer operation apparatus in accordance with claim 1 including a boiler in the circulating water circuit, which feeds heat directly to the circulating water circuit and a three-way valve, which is operable to short-circuit the circulating water circuit.

* * * * *